United States Patent [19]
Savage et al.

[11] Patent Number: 5,827,267
[45] Date of Patent: Oct. 27, 1998

[54] COOLED MULTI-FIBER MEDICAL CONNECTOR

[75] Inventors: Steven D. Savage, Brooklyn Center; Gregory G. Brucker, Minneapolis, both of Minn.

[73] Assignee: Angeion Corporation, Plymouth, Minn.

[21] Appl. No.: 836,226

[22] Filed: Feb. 18, 1992

[51] Int. Cl.⁶ .................................................. A61B 17/36
[52] U.S. Cl. ................................. 606/16; 606/15; 606/14
[58] Field of Search ........................... 606/2, 3, 7, 10–17; 128/395–398; 607/88, 89

[56] References Cited

U.S. PATENT DOCUMENTS

| | | | |
|---|---|---|---|
| 4,676,242 | 6/1987 | Doi | 606/16 |
| 4,819,630 | 4/1989 | DeHart | 606/16 X |
| 4,832,024 | 5/1989 | Boussignal et al. | 606/7 |
| 4,848,339 | 7/1989 | Rink et al. | 606/16 X |
| 4,959,063 | 9/1990 | Kojima | 606/15 |
| 4,971,034 | 11/1990 | Doi et al. | 606/15 X |
| 4,988,163 | 1/1991 | Cohen et al. | 606/15 X |
| 5,034,010 | 7/1991 | Kitrell et al. | 606/15 |
| 5,129,896 | 7/1992 | Hasson | 606/15 |
| 5,152,277 | 10/1992 | Honda et al. | 606/15 X |

*Primary Examiner*—Michael Peeffley
*Attorney, Agent, or Firm*—Patterson & Keough, P.A.

[57] ABSTRACT

Cooled optical connector for alignment and coupling of bundled fibers of an optic cable. Coolant in a liquid or gaseous form is passed through a chamber in which a bundled fiber optic cable and nut portion of a standard optical connector is contained. Coolant in either form moves through the cooled optical connector absorbing thermal energy and cooling the interstitial and exposed fibers and areas and the standard optical connector itself.

14 Claims, 3 Drawing Sheets

COOLED MULTI-FIBER MEDICAL CONNECTOR

CROSS REFERENCES TO CO-PENDING APPLICATIONS

U.S. patent application Ser. No. 07/608,281, filed Nov. 2, 1990, and U.S. patent application Ser. No. 07/608,290, filed Nov. 2, 1990, are commonly assigned to the assignee of the present invention.

BACKGROUND OF THE INVENTION

1. Field of the Invention

The present invention pertains to medical devices, and more particularly, to apparatus for using laser energy in various medical procedures.

2. Description of the Prior Art

It is known in the art to use laser energy for medical purposes. A common medical application is in the irradiation of biological tissue. For external use, the laser energy may be directly applied. However, when the procedure requires irradiation of tissue which is not readily accessible, the use of a laser catheter is common. A typical application for a laser catheter is in the cardiovascular system. U.S. Pat. Nos. 4,997,431 and 4,985,028, both issued to Isner et al., show laser catheters particularly adapted for laser irradiation within the cardiovascular system.

As higher and higher powers have been used for tissue irradiation, problems have developed with regard to dissipation of excess heat energy at the connector interface with the laser. U.S. Pat. No. 4,832,024 issued to Boussignac et al., recognizes the desirability of supplying a fluid to cool the distal end of the laser catheter. An optical conduction rod is cooled in U.S. Pat. No. 4,819,630 issued to DeHart. U.S. Pat. No. 4,669,819 issued to Hengst et al., shows an optical connector having a separate lumen for the conduction of a fluid.

None of the prior art references seem to recognize the need to cool the optical connector itself. This function is necessary in higher powered medical laser ablation systems quite apart from the possible additional need to cool other system components.

SUMMARY OF THE INVENTION

The present invention overcomes the deficiencies of the prior art by dissipating the excess thermal energy in a standard optical connector in an active cooling medium such as water or air.

The general purpose of the present invention is to provide a cooled standardized multi-fiber optical connector. A connector nut is located centrally about a tubular member having a coolant inlet port, a coolant outlet port and a optical fiber bundle are aligned centrally along the interior of the tubular member. Coolant travels along the interior of the tubular member and along the centrally aligned optical fiber bundle. Coolant is passed through portions of spacer rings to cool the exterior of individual optical fibers of the bundle. Coolant is also routed to cool interstitial spaces created by the optical fiber bundle. Coolant is subsequently channeled to dissipate heat from the resident female connector nut and an externally mounted male connector portion attached to the resident female connector nut. Coolant is dissipated through a coolant outlet port.

According to one embodiment of the present invention, there is an inner plastic tube located coaxially within a outer metallic tube. An optical fiber bundle connects to the inner plastic tube and aligns coaxially through and along the length of the inner plastic tube and the outer metallic tube. An adjustment nut secures the inner plastic tube to the outer metallic tube. A coolant inlet port extends perpendicularly from the inner plastic tube, and a coolant outlet tube extends perpendicularly from the outer metallic tube. A resident standard connector nut aligns over the outer metallic tube. A lens at the distal end aligns perpendicularly to the longitudinal axis of the outer and inner tubes.

One significant aspect and feature of the present invention is a standard optical connector which is actively cooled by a circulating coolant.

Having thus described significant aspects of the present invention, it is the principal object hereof to provide a standardized cooled multi-fiber optical connector.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
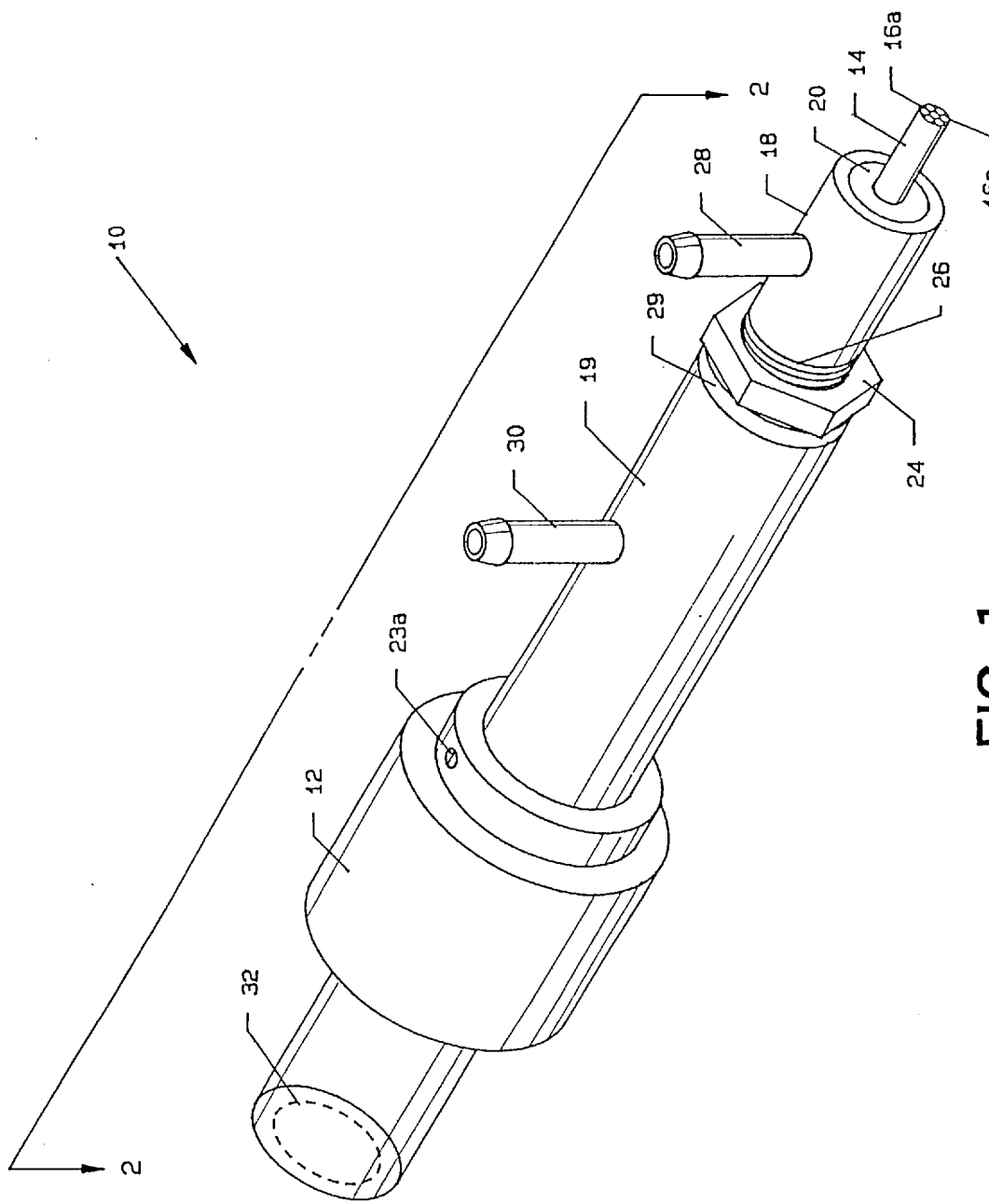
FIG. 1 illustrates a perspective view of a cooled multi-fiber optical connector.
Figure 2:
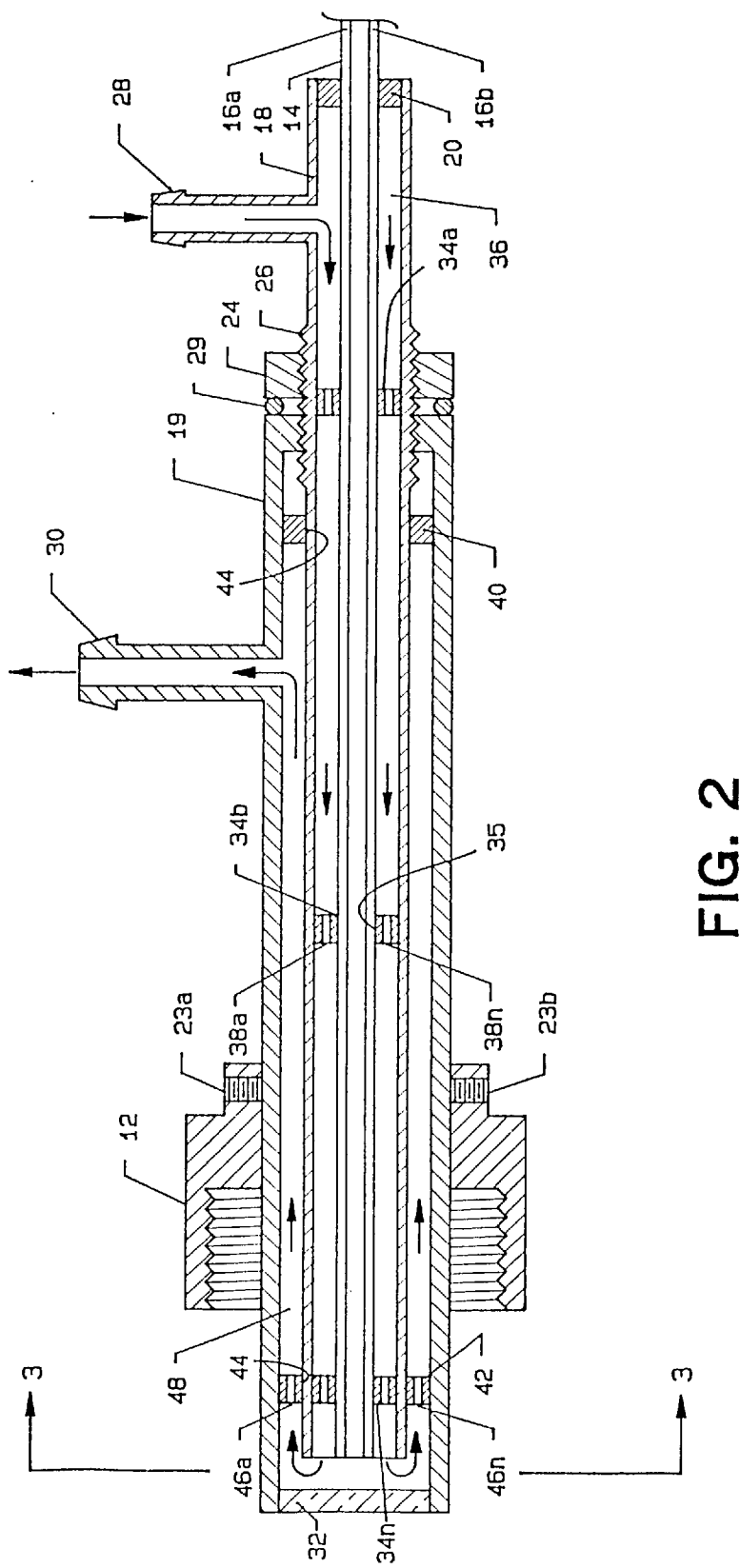
FIG. 2 illustrates a cross-sectional view of the optical connector along line 2—2 of FIG. 1; and, FIG. 3 illustrates a cross-sectional view of FIG. 2 along line 3—3 of FIG. 2.

FIG. 1 illustrates a perspective view of the components of a cooled multi-fiber optical connector 10. At the center of the system is a standard optical connector 12 through which a optic fiber bundle 14, including a plurality of individual optical fibers 16a–16n, passes. Seven optical fibers 16a–16n, for purposes of illustration only and not to be construed as limiting of the present invention, are placed in array with one fiber in the center and six fibers around the periphery of the center fiber. This optical fiber bundle 14 is placed in a plastic tube 18, which is partially threaded on the outside and which has an internal lumen slightly larger than the diameter of the seven fiber bundle. The plastic tube 18 extends along the length of a metallic tube 19. The individual optical fibers 16a–16n are adhesively attached with epoxy at one end of the plastic tube 18 by an epoxy bond 20. The plastic tube 18 is then threaded into and extends the length of the metallic tube 19, such that the individual optical fibers 16a–16n extend slightly beyond the face of the standard optical connector half 12, as illustrated in FIG. 2, for subsequent alignment with a fiber optic cable opposite a quartz lens 32. The female optical connector half 12 aligns over the metallic tube 19, and is positionally secured by set screws 23a and 23b. A nut 24, aligned on threads 26 of the plastic tube 18, tightens and seals against the proximal end of the metallic tube 19 and an interceding seal 29. A coolant inlet port 28 extends perpendicularly from the plastic tube 18 for introduction of coolant into the interior of the plastic tube 18. A coolant outlet tube 30 extends perpendicularly from larger metallic tube 19 for removal of coolant from the cooled multi-fiber optical connector 10. An optically flat quartz lens 32 aligns at the distal end of the metallic tube 19.

During operation, a coolant flow, such as air or water, passes through the coolant inlet port 28, through the lumen of the plastic tube 18 and along the optical fibers 16a–16n, through the space between the tubes 18 and 19, and out the coolant outlet port 30. For a liquid system, such flow can be reversed without any change in functioning of the flow. For an air or gaseous system, the design can be simplified by removal of the quartz lens 32, and coolant outlet port 30, and air can be passed from the proximal end towards the distal end and allowed to diffuse in the optical connector and associated components of the apparatus or of the connecting apparatus. Gaseous coolants, such as nitrogen, air and carbon dioxide can be exhausted into the surrounding air. The pressure of the gas storage is typically sufficient to pump the gas through the system.

Liquid coolants are preferably pumped into the standard optical connector through inlet port 28 and out through port 30. The coolant can then be passed through a heat exchanger and recycled into the connector.

This embodiment is used for purposes of illustration only. The present invention taught herein may be applied to as few as two fibers and as many as 100 fibers, and may be applied over a range of other commercially available optical connectors. Any fluid capable of absorbing heat and capable of flow through narrow passageways can be used to provide the required cooling.

Figure 3:
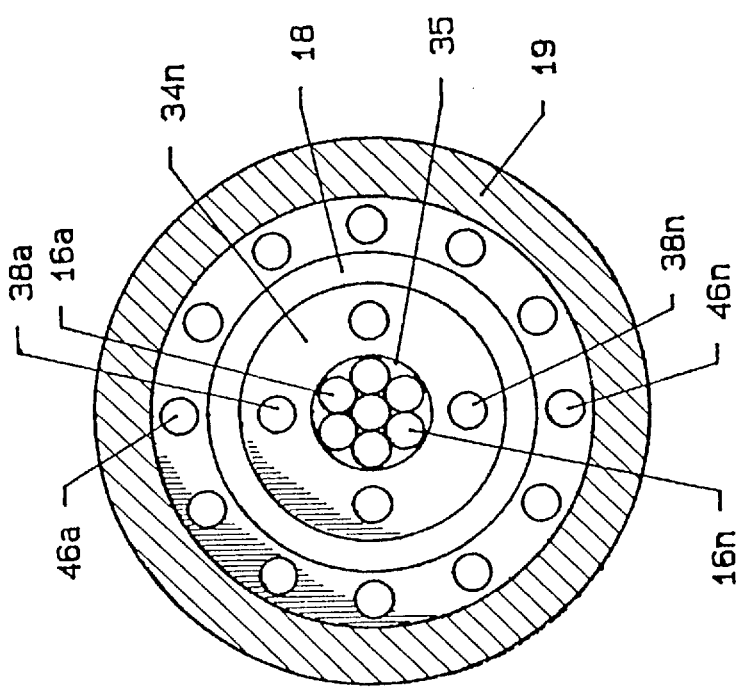

FIG. 2 illustrates a cross-sectional view of FIG. 1 along line 2—2 of FIG. 1 where all numerals correspond to those elements previously described. A plurality of toroidal spacers, including spacers 34a–34n, align in the lumen 36 and against the inner periphery of the plastic tube 18. Each spacer 34a–34n has a central hole 35 through which the bundled optic fiber 14 centrally aligns. The optical fibers are loosely bundled between spacers 34a–34n, allowing penetration of the cooling medium into the interstitial spaces within the fiber optic bundle. Each of the spacers 34a–34n has a plurality of passage holes 38a–38n parallel to the axis of each spacer as also illustrated in FIG. 3. Another set of spacers, including spacers 40 and 42, centrally align the plastic tube 18 coaxially within the larger metallic tube 19. Spacers 40 and 42 are similar in size, and each includes a central hole 44 for accommodation of the plastic tube 18. The spacers 40 and 42 align against the inner periphery of the metallic tube 19. The spacer 42 includes a plurality of passage holes 46a–46n parallel to the axis of the spacer 42. An annular passageway 48 is formed between the interior periphery of the metallic tube 19 and the exterior periphery of the plastic tube 18.

Coolant, in the form of liquid or gas, flows into the lumen 36 via the coolant inlet port 28. The fluid flows through the lumen 36, along the periphery of the bundled optic fiber 14, and more expressly, along the exposed periphery of each of the individual optical fibers 16a–16n, as well as the interstitial spaces between the fibers. In addition, coolant flows through the passage holes 38a–38n in the spacers 34a–34n in a direction which is parallel to the interstitial flow. The coolant continues flow along the fibers as described, and exits the distal end of the plastic tube 18 where the flow course is reversed to travel through the passage holes 46a–46n in the spacer 42 and along the annular passageway 48. Coolant carries off heat from the metallic tube 19, from the attached optical connector 12 and an attached external connector portion. Coolant then is removed through the coolant outlet port 30, exiting after having absorbed much of the excess heat dissipated within the optical connector.

With reference to FIG. 3, it is noted that the number of passage holes 38a–38n may be varied to cause more or less flow along the interstitial areas of the bundled optic fiber 14. Four passage holes 38a–38n are shown for purpose of illustration only. If only two holes were used, then flow along the interstitial area would increase, and, conversely, if six holes were incorporated, flow along the interstitial area would decrease and flow along the outer more exposed area would increase. Any number of holes can be used to accomplish the most uniform and/or efficient cooling as desired. Other factors, such as viscosity of the coolant fluid, also effect the relative flow.

FIG. 3 illustrates a cross-sectional view along line 3—3 of FIG. 2 where all numerals correspond to those elements previously described.

MODE OF OPERATION

As can be seen from the end view of FIG. 3, the multiple fiber arrangement does not cover the entire surface area bounded by a circle containing the largest diameter of the outermost fibers. As a result, interstitial spaces exist between the fibers which can allow penetration of laser energy into the center of the optical connector. This energy is ultimately intercepted by the fiber or connector and converted to thermal energy. If this energy is not removed, the temperature of the components will rise initially, affecting the alignment of the fibers with an incident laser beam or ultimately causing structural degradation of either the fiber or the connector. In a typical application, up to 50% of the energy may pass around the fibers and into the cladding or optical connector itself. At power levels of 50 watts, such energy levels can destroy the connector within a matter of seconds.

Since the packing density of the fibers in the connector is fixed by the geometry of the fibers and their geometric relationship, it is not possible to achieve packing densities much greater than 75%. While optically it may be possible to refocus the incoming beam to precisely fall on each of the individual fibers, such a system would not only be expensive, but require both axial and circumferential alignment in the field. Such a system would not provide the user-friendliness necessary for use in medical applications.

The current invention allows the energy to pass between the fibers into the cladding and connector, and after conversion of the laser energy into heat, to remove the heat by a fluid flowing around the fibers through the connector. The cooling fluid could be a gas, such as air, nitrogen, carbon dioxide; a liquid, such as water; or indexing matching fluid, such as an oil. In each case, the fluid moves through the connector, absorbing thermal energy and cooling the optical fibers and optical connector itself.

The advantages of such a system are that continuous irradiation of a connector with high levels of power can be accomplished over a long period of time. Power levels up to 100 watts for 10 minutes are possible with such a system. By actively removing the laser energy, which is not transmitted by the fibers, the structural integrity of the connector system and the optical alignment of the fibers with the laser beam can be maintained.

Having thus described the preferred embodiments of the present invention, those of skill in the art will readily be able to apply the teachings found herein to yet other embodiments within the scope of the claims hereto attached.

We claim:

1. A multi-fiber optical connector housing operatively connecting a distal end of an optical fiber bundle to a laser energy source used in a laser catheter system, comprising:

a. an optical fiber bundle comprising a plurality of optical fibers housed in an inner tube, the optical fiber bundle having a proximal end and a distal end operatively connected to the laser energy source;

b. an outer tube housing a substantial portion of said inner tube and forming a cooling chamber surrounding the optical fibers within the connector housing, the distal end of the optical fiber bundle terminating within the outer tube;

c. a coolant fluid inlet in fluid communication with said cooling chamber;

d. a coolant fluid outlet in fluid communication with said cooling chamber; and e. a coolant fluid flow path between said coolant fluid inlet and said coolant fluid outlet;

whereby a cooling fluid may be flowed through the cooling chamber to dissipate heat generated by laser energy from the laser energy source which enters the interstitial spaces between the optical fibers at the distal end of the optical fiber bundle the dissipation of the heat preserving the structural integrity and optical alignment of the system.

2. The multi-fiber optical connector housing of claim 1 wherein said plurality of optical fibers are affixed along the central longitudinal axis of said inner tube by means of a plurality of disk-shaped spacers, each of said spacers having a central bore through which said plurality of optical fibers passes and a plurality of holes forming part of said coolant fluid flow path.

3. The multi-fiber optical connector housing of claim 1 wherein said coolant fluid outlet comprises an outlet port on said outer tube.

4. The multi-fiber optical connector housing of claim 1 wherein said coolant fluid is liquid.

5. The multi-fiber optical connector housing of claim 1 wherein said coolant fluid is gaseous.

6. The multi-fiber optical connector housing of claim 5 wherein said coolant fluid is air.

7. The multi-fiber optical connector housing of claim 1 including means affixing said plurality of optical fibers at spaced points along the central longitudinal axis of said inner tube.

8. The multi-fiber optical connector housing of claim 7 wherein said means affixing restricts flow of said coolant fluid.

9. The multi-fiber optical connector housing of claim 8 wherein said means affixing is disc shaped and has a central bore through which said optical fibers pass.

10. The multi-fiber optical connector housing of claim 9 wherein said means affixing includes at least one hole in said disc for coolant fluid to pass.

11. A method of cooling a multi-fiber optical connector housing in a laser catheter system, the connector housing comprising an optical fiber bundle comprising a plurality of bundled optical fibers housed in an inner tube of the connector housing, the optical fiber bundle including a distal end operatively connected to a laser energy source used in the laser catheter system; the connector housing further comprising an outer tube housing a substantial portion of said inner tube, said outer tube having an inner diameter greater than the outer diameter of said inner tube so that an annular recess is formed therebetween, the distal end of the optical fiber bundle terminating within the outer tube; the connector housing further comprising a coolant fluid inlet and a coolant fluid outlet, the method comprising:

providing coolant fluid flow from said inlet, along the interstices of said plurality of bundled optical fibers, along said annular recess between said inner and outer tubes, and out said outlet, thereby dissipating the heat generated by laser energy from the laser energy source which enters the interstitial spaces between the optical fibers at the distal end of the optical fiber bundle, the dissipation of the heat preserving the structural integrity and optical alignment of the system.

12. The method of claim 11 wherein said plurality of bundled optical fibers are affixed along the central longitudinal axis of said inner tube by means of a plurality of disk-shaped spacers, each of said spacers having a central bore through which said plurality of optical fibers passes and a plurality of holes, and wherein said coolant fluid flows through said plurality of holes.

13. The method of claim 11, further comprising recycling said coolant fluid back into said inlet.

14. The method of claim 11, wherein said coolant fluid is pumped into said inlet.

\* \* \* \* \*